(12) United States Patent
Chen et al.

(10) Patent No.: US 9,793,785 B2
(45) Date of Patent: Oct. 17, 2017

(54) LINEAR MOTOR

(71) Applicant: ScienBizip Consulting (ShenZhen) Co., Ltd., Shenzhen (CN)

(72) Inventors: Mi-Chien Chen, New Taipei (TW); Chi-Huan Shao, New Taipei (TW)

(73) Assignee: ScienBiziP Consulting(Shenzhen)Co.,Ltd., Shenzhen (CN)

( * ) Notice: Subject to any disclaimer, the term of this patent is extended or adjusted under 35 U.S.C. 154(b) by 130 days.

(21) Appl. No.: 14/689,548

(22) Filed: Apr. 17, 2015

(65) Prior Publication Data

US 2016/0164393 A1   Jun. 9, 2016

(30) Foreign Application Priority Data

Dec. 8, 2014   (TW) .............................. 103142568 A

(51) Int. Cl.
*H02K 41/02*   (2006.01)
*H02K 41/03*   (2006.01)
*H02K 7/08*   (2006.01)

(52) U.S. Cl.
CPC ............. *H02K 41/031* (2013.01); *H02K 7/08* (2013.01)

(58) Field of Classification Search
CPC .................................. H02K 41/02; H02K 7/08
USPC ................... 310/12.01–12.33, 52, 54, 58, 64
See application file for complete search history.

(56) References Cited

U.S. PATENT DOCUMENTS

| | | | |
|---|---|---|---|
| 6,336,744 B1* | 1/2002 | Rehm | B23Q 5/28 29/898.03 |
| 8,008,815 B2* | 8/2011 | Ro | B23Q 1/62 310/12.05 |
| 8,674,563 B2* | 3/2014 | Lamouree | H02K 5/10 310/12.18 |
| 2005/0275293 A1* | 12/2005 | Kang | H02K 41/025 310/12.22 |

* cited by examiner

*Primary Examiner* — Hanh Nguyen
(74) *Attorney, Agent, or Firm* — Steven Reiss

(57) ABSTRACT

A linear motor includes a stator and a mover coupled to the stator. The stator includes a stator body and at least one guiding portion protruding from the stator body. The mover includes a mover body and at least one sliding portion protruding from the mover body. The at least one sliding portion defines a receiving groove. The at least one guiding portion is received in the receiving groove. A gap is defined between the at least one guiding portion and the at least one sliding portion. The mover defines at least one air inlet hole communicating with the gap and configured to inject air into the gap.

15 Claims, 4 Drawing Sheets

LINEAR MOTOR

FIELD

The subject matter herein generally relates to linear motors, and particularly to an aerostatic linear motor.

BACKGROUND

A linear motor can be used to move a member. The linear motor can include a stator and a mover. The mover can move relative to the stator.

BRIEF DESCRIPTION OF THE DRAWINGS

Implementations of the present technology will now be described, by way of example only, with reference to the attached figures.

DETAILED DESCRIPTION

Figure 1:
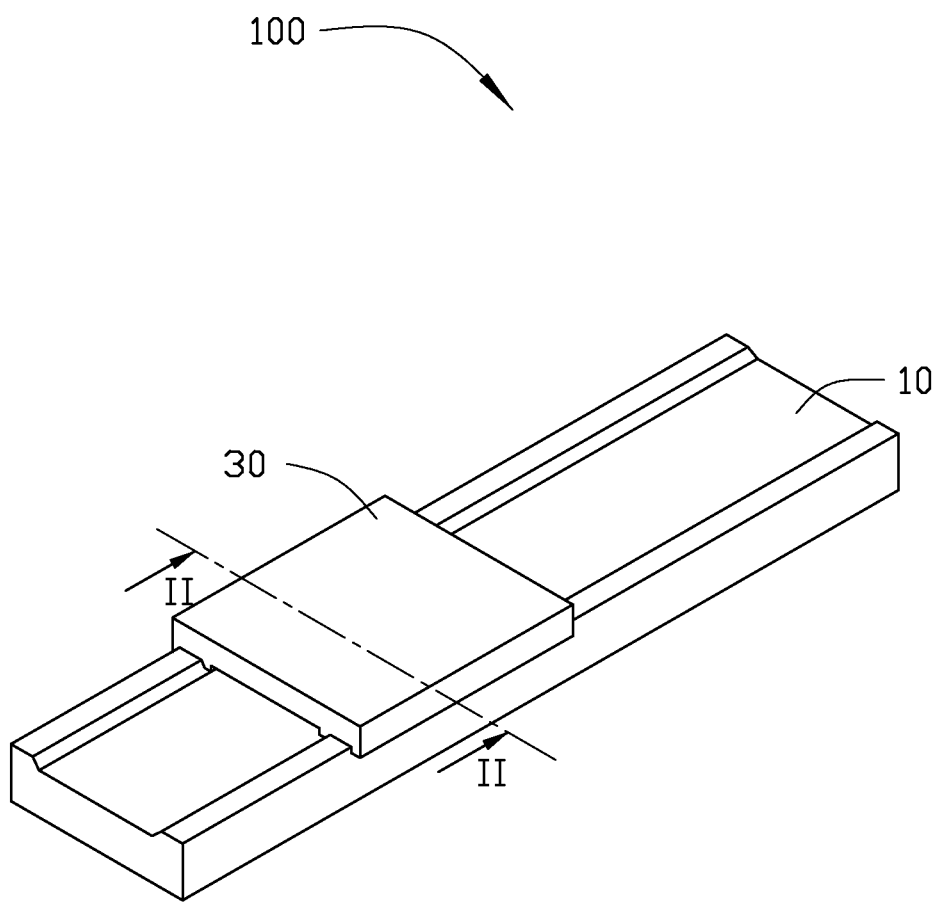
FIG. 1 is an isometric view of a first embodiment of a linear motor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a linear motor can include a stator and a mover coupled to the stator. The stator can include a stator body and at least one guiding portion protruding from the stator body. The mover can include a mover body and at least one sliding portion protruding from the mover body. The at least one sliding portion can define a receiving groove. The at least one guiding portion can be received in the receiving groove. A gap can be defined between the at least one guiding portion and the at least one sliding portion. The mover can define at least one air inlet hole communicating with the gap and configured to inject air into the gap.

The present disclosure is in relation to a linear motor can include a stator and a mover. The stator can have a stator body and at least one guiding portion protruding from the stator body. The mover can have a mover body and at least one sliding portion, with a defined receiving groove, protruding from the mover body. The at least one guiding portion can be received in the receiving groove of the at least one sliding portion. The mover can include at least one air inlet hole for injecting air to create a gap between the at least one guiding portion and the at least one receiving groove.

The present disclosure is in relation to a linear motor can include a stator and a mover. The stator can have a stator body and at least one guiding portion protruding from the stator body. The mover can have a mover body and at least one sliding portion, with a defined receiving groove, protruding from the mover body. The at least one guiding portion can be received in the receiving groove of the at least one sliding portion. Each receiving groove can include a plurality of air inlets. A gap can be created between the guiding portion received in the receiving groove when air is injected into the plurality of air inlets.

Figure 2:
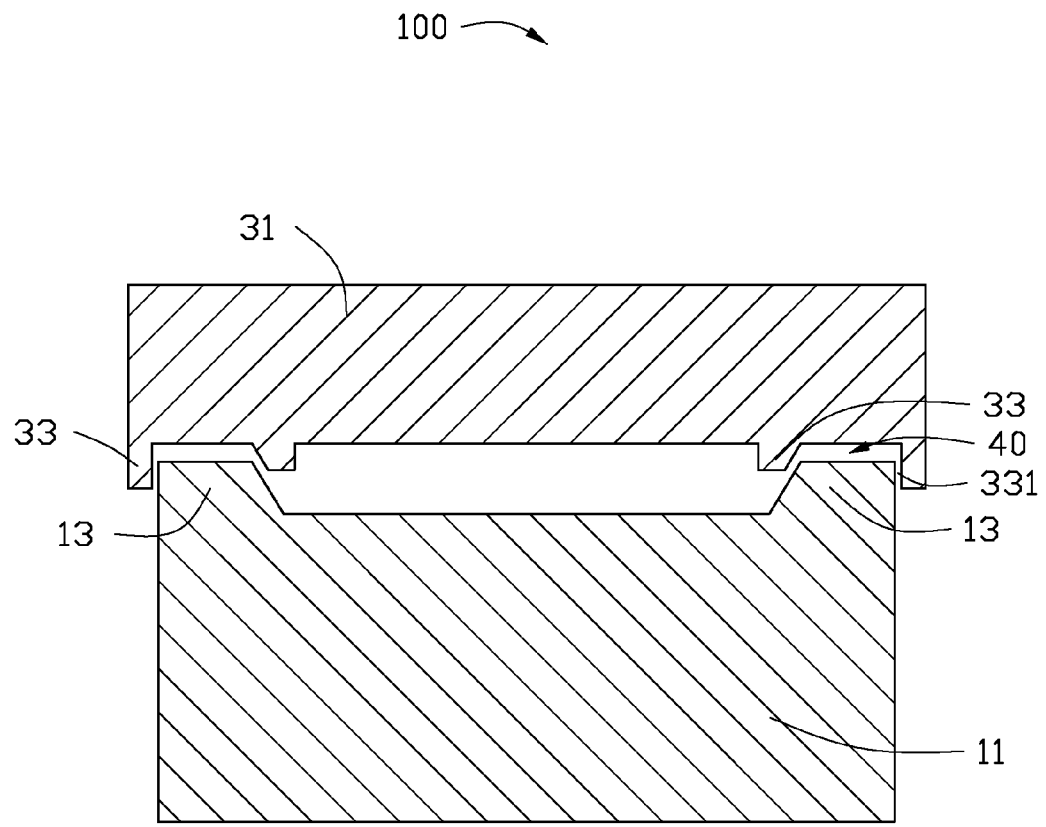
FIG. 2 is a cross-sectional view taken along line II-II of the linear motor of FIG. 1.

FIG. 1 illustrates a first embodiment of a linear motor 100 which can include a stator 10 and a mover 30. FIG. 2 shows that a gap 40 can be defined between the stator 10 and the mover 30. One of the stator 10 and the mover 30 can have a plurality of permanent magnets. Another one of the stator 10 and the mover 30 can have coil windings. When the coil windings are electrified, the mover 30 can linearly move relative to the stator 10. When in use, air can be injected to the gap 40 to decrease a friction between the stator 10 and the mover 30, thus to decrease a vibration and a noise of the linear motor 100.

The stator 10 can include a stator body 11 and at least one guiding portion 13 protruding from the stator body 11. In the illustrated embodiment, a number of the guiding portion 13 can be two. The guiding portions 13 can protrude from a top of the stator body 11 and spaced from each other. The stator body 11 and the guiding portions 13 can be integrated with each other. Each guiding portion 13 can be positioned at an edge of the stator body 11. In the illustrated embodiment, a cross-sectional surface of the guiding portion 13 can be substantially right-angled trapezoid shaped.

The mover 30 can include a mover body 31 and at least one sliding portion 33 protruding from the at least one mover body 31. In the illustrated embodiment, a number of the sliding portion 33 can be two. The sliding portions 33 can protrude from a bottom of the mover body 31 and spaced from each other. Each sliding portion 33 can be positioned at an edge of the mover body 31. The sliding portions 33 and the mover body 31 can be integrated with each other. Each sliding portion 33 can define a receiving groove 331. A cross-sectional view of the receiving groove 331 can be substantially right-angled trapezoid shaped.

Each guiding portion 13 can be received in the corresponding receiving groove 331. The gap 40 can be defined between each sliding portion 33 and the corresponding guiding portion 13. When air is injected into the gap 40, an air medium layer can be formed between the guiding portions 13 and the sliding portions 33. Therefore, a friction between the guiding portions 13 and the sliding portions 33 can be decreased. In at least one embodiment, a shape of the guiding portions 13 or the receiving grooves 331 can be not limited to the first embodiment.

Figure 3:
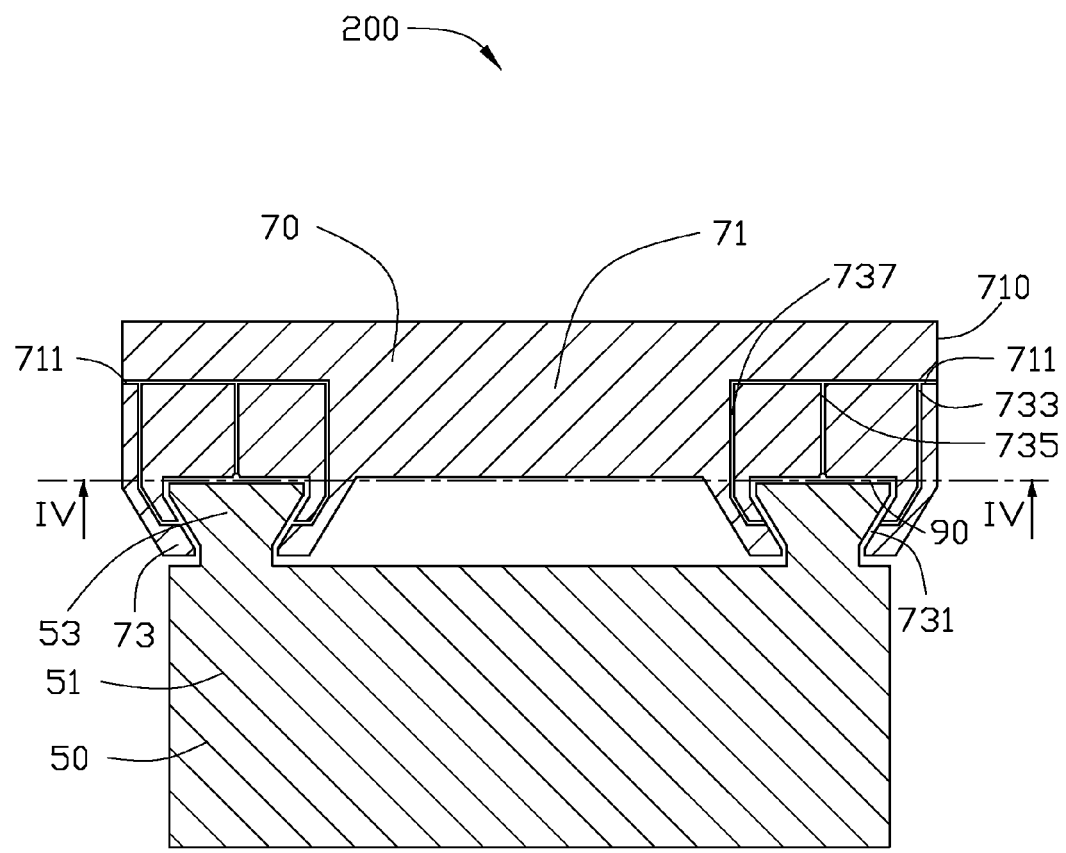
FIG. 3 is a cross-sectional view of a second embodiment of a linear motor including a mover.

FIG. 3 illustrates a second embodiment of a linear motor 200 which is similar to the linear motor 100 of the first embodiment. The linear motor 200 can include a stator 50 and a mover 70 coupled to the stator 50. The stator 50 can include a stator body 51 and two guiding portions 53. The mover 70 can include a mover body 71 and two sliding portions 73. Each sliding portion 73 can define a receiving groove 731. A gap 90 can be defined between each guiding portion 53 and the corresponding sliding portion 73. The differences between the linear motor 200 of the second embodiment and the linear motor 100 of the first embodiment are illustrated below.

A cross-sectional surface of the guiding portion 53 can be substantially inverted isosceles trapezoid shaped. The receiving groove 731 can be substantially a dovetail groove.

The mover 70 of the linear motor 200 can define a plurality of air inlet holes 711 at opposite side surfaces 710 thereof. The mover 70 further can define a first air channel 733, a second air channel 735, and a third air channel 737 corresponding to each air inlet hole 711. Both of the first air channel 733, the second air channel 735, and the third air channel 737 can communicate with the corresponding air inlet hole 711. The first air channel 733, the second air channel 735, and the third air channel 737 can run through three inner surfaces 738 of the receiving groove 731, respectively. Thus, air can be injected into the gap 90 via the air inlet hole 711, the first air channel 733, the second air channel 735, and the third air channel 737. The three inner surfaces 738 can define the receiving groove 731. In the illustrated embodiment, each side surface 710 of the mover 70 can define fourteen air inlet holes 711.

Figure 4:
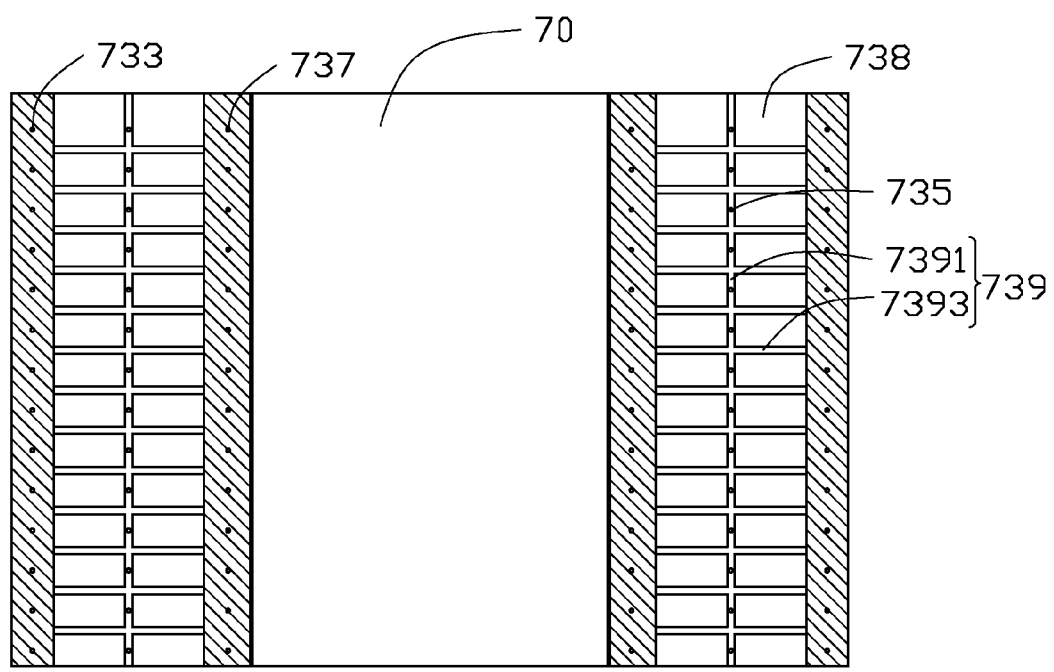
FIG. 4 is a cross-sectional view taken along line IV-IV of the mover of FIG. 3.

FIG. 4 illustrates that each inner surface 738 can define at least one air guiding groove 739 communicating with the air inlet holes 711. In the illustrated embodiment, the air guiding groove 739 can include a first air guiding groove 7391 and a plurality of second air guiding grooves 7393. The first air guiding groove 7391 can be arranged along a longitudinal direction of the inner surface 738. The first air guiding groove 7391 can communicate with the corresponding air channel. FIG. 4 shows that the first air guiding groove 7391 defined at a horizontal inner surface 738 can communicate with the second air channel 735.

The second air guiding grooves 7393 can be arranged in horizontal direction of the inner surface 738 and intersect with the first air guiding groove 7391. The second air guiding grooves 7393 can communicate with the first air guiding groove 7391 and parallel to each other. Thus, air can be evenly guided to the gap 90 via the first air guiding groove 7391 and the second air guiding grooves 7393. The second air guiding grooves 7393 defined at adjacent inner surfaces 738 can communicate with each other. In the illustrated embodiment, a number of the first air guiding groove 7391 can be one. A number of the second air guiding groove 7393 can be thirteen. Each second air guiding groove 7393 can be positioned between two adjacent second air channels 735. In at least one embodiment, numbers of the first air guiding groove 7391 and the second guiding groove 7393 can be not limited in the illustrated embodiment. Each side surface 710 of the mover 71 can define only one air inlet hole 711. The air guiding grooves 739 can be only defined at one inner surface 738.

When in use, air can be injected from the air inlet hole 711 and finally enter the gap 90 via the first air channel 733, the second air channel 735, and the second air channel 737.

When air enters into the gap 90, air can spread via the first air guiding groove 7391 and the second air guiding grooves 7393.

The embodiments shown and described above are only examples. Many details are often found in the art such as the other features of a linear motor. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A linear motor comprising:
a stator comprising a stator body and at least one guiding portion protruding from the stator body; and
a mover coupled to the stator and comprising a mover body and at least one sliding portion protruding from the mover body, the at least one sliding portion defining a receiving groove, the at least one guiding portion received in the receiving groove, a gap being defined between the at least one guiding portion and the at least one sliding portion, the mover defining at least one air inlet hole communicating with the gap and configured to inject air into the gap;
wherein the mover further defines a first air channel, a second air channel, and a third air channel corresponding to each air inlet hole, each of the first air channel, the second air channel, and the third air channel communicating with the corresponding air inlet hole, and the first air channel, the second air channel, and the third air channel running through three inner surfaces of the receiving groove.

2. The linear motor of claim 1, wherein at least one of the inner surfaces defines at least one air guiding groove communicating with the at least one air inlet hole.

3. The linear motor of claim 1, wherein at least one of the inner surfaces defines a first air guiding groove and a plurality of second air guiding grooves intersecting with the first air guiding groove, the plurality of second air guiding grooves communicate with the first air guiding groove, the first air guiding groove communicates with the at least one air inlet hole.

4. The linear motor of claim 3, wherein the first air guiding groove communicates with the second air channel.

5. The linear motor of claim 1, wherein the at least one guiding portion protrudes from a top of the stator body, the at least one sliding portion protrudes from a bottom of the mover body.

6. The linear motor of claim 1, wherein a cross-sectional surface of the at least one guiding portion is substantially right-angled trapezoid shaped, a cross-sectional view of the receiving groove is substantially right-angled trapezoid shaped.

7. The linear motor of claim 1, wherein a cross-sectional surface of the at least one guiding portion is substantially inverted isosceles trapezoid shaped, the receiving groove is substantially a dovetail groove.

8. A linear motor comprising:
a stator having a stator body and at least one guiding portion protruding from the stator body; and a mover having a mover body and at least one sliding portion, with a defined receiving groove, protruding from the mover body;

wherein, the at least one guiding portion is received in the receiving groove of the at least one sliding portion;

wherein, the mover comprises at least one air inlet hole for injecting air to create a gap between the at least one guiding portion and the at least one receiving groove; and wherein, the mover further defines a first air channel, a second air channel, and a third air channel corresponding to each air inlet hole, each of the first air channel, the second air channel, and the third air channel communicating with the corresponding air inlet hole, and the first air channel, the second air channel, and the third air channel running through three inner surfaces of the receiving groove.

9. The linear motor of claim 8, wherein at least one of the inner surfaces defines at least one air guiding groove communicating with the at least one air inlet hole.

10. The linear motor of claim 8, wherein at least one of the inner surfaces defines a first air guiding groove and a plurality of second air guiding grooves intersecting with the first air guiding groove, the plurality of second air guiding grooves communicate with the first air guiding groove, the first air guiding groove communicates with the at least one air inlet hole.

11. The linear motor of claim 10, wherein the first air guiding groove communicates with the second air channel.

12. The linear motor of claim 8, wherein the at least one guiding portion protrudes from a top of the stator body, the at least one sliding portion protrudes from a bottom of the mover body.

13. The linear motor of claim 8, wherein a cross-sectional surface of the at least one guiding portion is substantially right-angled trapezoid shaped, a cross-sectional view of the receiving groove is substantially right-angled trapezoid shaped.

14. The linear motor of claim 8, wherein a cross-sectional surface of the at least one guiding portion is substantially inverted isosceles trapezoid shaped, the receiving groove is substantially a dovetail groove.

15. A linear motor comprising:

a stator having a stator body and at least one guiding portion protruding from the stator body; and a mover having a mover body and at least one sliding portion, with a defined receiving groove, protruding from the mover body;

wherein, the at least one guiding portion is received in the receiving groove of the at least one sliding portion;

wherein, each receiving groove comprises a plurality of air inlets;

wherein, a gap is created between the guiding portion received in the receiving groove when air is injected into the plurality of air inlets; and wherein the mover further defines a first air channel, a second air channel, and a third air channel corresponding to each air inlet, each of the first air channel, the second air channel, and the third air channel communicating with the corresponding air inlet, and the first air channel, the second air channel, and the third air channel running through three inner surfaces of the receiving groove.

* * * * *